(12) United States Patent
Hwang et al.

(10) Patent No.: US 9,306,826 B2
(45) Date of Patent: Apr. 5, 2016

(54) METHOD AND APPARATUS FOR ESTIMATING QUEUING DELAY

(71) Applicant: SAMSUNG SDS CO., LTD., Seoul (KR)

(72) Inventors: Jin Bum Hwang, Namyangju-si (KR); Chang Hoon Lee, Yongin-si (KR); Hyung Joo Mo, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 141 days.

(21) Appl. No.: 14/288,565

(22) Filed: May 28, 2014

(65) Prior Publication Data

US 2015/0117250 A1 Apr. 30, 2015

(30) Foreign Application Priority Data

Oct. 30, 2013 (KR) .................. 10-2013-0129990

(51) Int. Cl.
*H04L 12/26* (2006.01)
*H04L 12/24* (2006.01)

(52) U.S. Cl.
CPC .......... *H04L 43/0864* (2013.01); *H04L 41/147* (2013.01); *H04L 43/0858* (2013.01)

(58) Field of Classification Search
None
See application file for complete search history.

(56) References Cited

U.S. PATENT DOCUMENTS

| | | | | |
|---|---|---|---|---|
| 7,672,283 B1* | 3/2010 | Chang | ................... | H04W 12/12 370/338 |
| 7,974,195 B2* | 7/2011 | Jin | ................... | H04L 47/10 370/231 |
| 2004/0223566 A1* | 11/2004 | Yamashita | ................ | H04L 7/00 375/354 |
| 2010/0020689 A1* | 1/2010 | Tang | ................ | H04L 47/10 370/235 |
| 2010/0135332 A1* | 6/2010 | Siemens | ............... | H04J 3/0667 370/503 |
| 2012/0275336 A1* | 11/2012 | Wise | .................... | H04L 1/1825 370/252 |

* cited by examiner

*Primary Examiner* — Chi H Pham
*Assistant Examiner* — Soon-Dong D Hyun
(74) *Attorney, Agent, or Firm* — Sughrue Mion, PLLC

(57) ABSTRACT

Provided is a method of estimating a queuing delay. The method includes: obtaining a round trip time (RTT) reference value, a forward one-way transmit time (OTT) reference value and a backward OTT reference value; and in accordance with a determination of whether a first increment rate is larger or smaller than a second increment rate, updating one of the forward OTT reference value and the backward OTT reference value based on the RTT reference value, the first increment rate being a rate of increment in local time of the transmitter, the second increment rate being a rate of increment in local time of the receiver.

25 Claims, 6 Drawing Sheets

FIG. 4

1 : if $RTT(t) \leq RTTmin$ do
2 :     $RTTmin = RTT(t)$
3 : endif

4 : if $OTT^f(t) < OTT^f min$ do
5 :     $OTT^f min = OTT^f(t)$
6 :     if last update time of $OTT^b min <$ current time $- T$ do
7 :         $OTT^b min = RTTmin - OTT^f min$
8 :     endif
9 :     update last update time of $OTT^f min$
10: endif 11: if $OTT^b(t) < OTT^b min$ do
12:     $OTT^b min = OTT^b(t)$
13:     if last update time of $OTT^f <$ current time $- T$ do
14:         $OTT^f min = RTTmin - OTT^b min$
15:     endif
16:     update last update time of $OTT^b min$
17: endif

FIG. 5

1 : if RTT(t) ≤ RTTmin do
2 :     RTTmin = RTT(t)
3 :     $RTT^f min = OTT^f min = OTT^f(t)$
4 :     $RTT^b min = OTT^b min = OTT^b(t)$
5 : else
6 :     if $OTT^f(t) < OTT^f min$ do
7 :         $OTT^f min = OTT^f(t)$
8 :     endif
9 :     if $OTT^b(t) < OTT^b min$ do
10:         $OTT^b min = OTT^b(t)$
11:     endif
12: endif 13: if $(RTT^f min - OTT^f min) - (RTT^b min - OTT^b min) > \theta$ do
14:     $OTT^b min = RTTmin - OTT^f min$
15: elseif $(RTT^f min - OTT^f min) - (RTT^b min - OTT^b min) < \theta$ do
16:     $OTT^f min = RTTmin - OTT^b min$
17: endif

FIG. 6

1 :  if RTT(t) < RTT do
2 :      RTTmin = RTT(t)
3 :      RTT$^f$min = OTT$^f$min = OTT$^f$(t)
4 :      RTT$^b$min = OTT$^b$min = OTT$^b$(t)
5 :  else
6 :      if OTT$^f$(t) < OTT$^f$min do
7 :          OTT$^f$min = OTT$^f$(t)
8 :      endif
9 :      if OTT$^b$(t) < OTT$^b$min do
10:          OTT$^b$min = OTT$^b$(t)
11:     endif
12: endif 13: if (RTT$^f$min − OTT$^f$min) − (RTT$^b$min − OTT$^b$min) > $\theta$ do
14:     RTTmin = RTTmin − (RTT$^b$min − OTT$^b$min)
15:     RTT$^b$min = OTT$^b$min
16:     OTT$^b$min = min{RTTmin − OTT$^f$min, OTT$^b$min(t − N, t)}
17: elseif (RTT$^f$min − OTT$^f$min) − (RTT$^b$min − OTT$^b$min) < $\theta$ do
18:     RTTmin = RTTmin − (RTT$^f$min − OTT$^f$min)
19:     RTT$^f$min = OTT$^f$min
20:     OTT$^f$min = min{RTTmin − OTT$^b$min, OTT$^f$min(t − N, t)}
21: endif

METHOD AND APPARATUS FOR ESTIMATING QUEUING DELAY

CROSS-REFERENCE TO RELATED APPLICATION

This application claims priority to and the benefit of Republic of Korea Patent Application No. 10-2013-0129990, filed on Oct. 30, 2013, the disclosure of which is incorporated herein by reference in its entirety.

BACKGROUND

1. Field

The present disclosure relates to data transmission control, and more particularly, to techniques for reducing errors in queuing delay estimation caused by a clock skew, thereby providing improved data transmission control.

2. Discussion of Related Art

A computer network may include several computing devices for exchanging data through a communication path. In such a computer network, a computing device, when transmitting data to another computing device, may perform data transmission control based on a queuing delay involved in the data transmission. For example, in a network environment in which a data packet is transmitted via a router on a communication path, a queuing delay may be defined as a length of time during which the data packet waits in a buffer of the router. When the communication path suffers from network congestion (for example, the number of data packets flowing into the router per unit time exceeds a throughput of the router), a data packet would wait in the buffer of the router until preceding data packets are processed by the router, even if the data packet has arrived at the router.

A TCP-Vegas technique, which is one of approaches of estimating the queuing delay, uses a round trip time (RTT) of a packet between a computing device that transmits data (hereinafter referred to as a "transmitter") and a computing device that receives the data (hereinafter referred to as a "receiver"). Specifically, the RTT between the transmitter and the receiver represents the time it takes for the transmitter to send a packet to the receiver and receive, from the receiver, a response to the packet. For example, when the transmitter and the receiver are deployed in the above-mentioned network environment, the RTT between the transmitter and the receiver is the sum of (i) a first length of time for a packet to travel from the transmitter to the router, (ii) a second length of time for the packet to move from the router to the receiver, (iii) a third length of time for a response to the packet to traverse from the receiver to the router, (iv) a fourth length of time for the response to pass from the router to the transmitter, and (v) a queuing delay in the buffer of the router. Since it is generally noted that the first to fourth lengths of time are fixed, a change in the RTT can be regarded as a change in the queuing delay. Accordingly, it is reasonable to estimate the queuing delay at a certain time point as a measured value of the RTT at the time point, minus a value of the RTT measured when the queuing delay is 0 (hereinafter denoted as "baseRTT").

Although, in fact, the queuing delay may be zero at a time point, it is unlikely to have direct knowledge of the time point. For example, in the above-mentioned network environment, it is rare that the transmitter and the receiver directly learn how full the buffer of the router is. Therefore, it is of great importance to estimate baseRTT prior to the estimation of the queuing delay. According to the TCP-Vegas technique, for a certain time $t=k$, $RTTmin(0, k)$ is used as an estimate of baseRTT, where $RTTmin(0, k)$ is a minimum value among the RTT values measured from $t=0$, which is a starting time point for the RTT measurement, to $t=k$. In other words, when the RTT measured at $t=k$ is denoted as $RTT(k)$, an estimate of the queuing delay for $t=k$ is $RTT(k)$ minus $RTTmin(0, k)$. For example, $RTTmin(0, k)$ may have a value of a variable RTTmin, which is updated at $t=k$, as follows. For $t=0$, RTTmin is set to $RTT(0)$. Then, for $t=k$, when the RTT measurement at $t=k$ is immediately preceded by the RTT measurement at $t=j$, the RTTmin value is changed to $RTT(k)$ if $RTT(k)$ is smaller than the value of RTTmin at $t=j$, and otherwise remains unchanged.

Alternatively, with a view to efficient operation of a computer network, the transmission control may be performed using a queuing delay on a forward path from a transmitter to a receiver (hereinafter referred to as a "forward queuing delay"). Such transmission control does not take into account a queuing delay on a backward path from the receiver to the transmitter (hereinafter referred to as a "backward queuing delay"), since the backward queuing delay is not associated with network congestion occurring on the forward path. For example, when the transmitter and the receiver are deployed in the above-mentioned network environment, the RTT between the transmitter and the receiver includes a length of time for a packet transmitted from the transmitter to the receiver to wait in the buffer of the router (that is, the forward queuing delay) and also includes a length of time for a response to the packet to wait in the buffer of the router in the course of traveling from the receiver to the transmitter (that is, the backward queuing delay). If network congestion occurs on the backward path and does not on the forward path, the transmission control need not be performed in a manner that reduces the transmission rate by reason of the backward queuing delay.

The forward queuing delay may be calculated using a one-way transmit time (OTT) on the forward path (hereinafter referred to as a "forward OTT"). The forward OTT is the time required for a packet to move from the transmitter to the receiver through the forward path, i.e., the time from when the packet departs from the transmitter to when the packet arrives at the receiver. In a manner similar to that for the estimation of baseRTT, $OTT^f min(0, k)$ may be used as an estimate of the forward OTT value that would be measured when the queuing delay is 0 (hereinafter referred to "baseOTT$^f$"), where $OTT^f min(0, k)$ is a minimum value among the forward OTT values measured from $t=0$, a starting time point for the forward OTT measurement, to $t=k$. Accordingly, when the forward OTT measured at $t=k$ is denoted as $OTT^f(k)$, an estimate of the forward queuing delay for $t=k$ is $OTT^f(k)$ minus $OTT^f min(0,k)$. For example, $OTT^f min(0, k)$ may have a value of a variable OTTmin, which is a variable updated at $t=k$, as follows. For $t=0$, $OTT^f min$ is set to $OTT^f(0)$. Then, for $t=k$, when the OTT measurement at $t=k$ is immediately preceded by the OTT measurement at $t=j$, the $OTT^f min$ value is changed to $OTT^f(k)$ if $OTT^f(k)$ is smaller than the value of $OTT^f min$ at $t=j$, and otherwise remains unchanged.

When the transmitter and the receiver have different clocks, however, the forward OTT measurement involves calculating a time difference between time points measured with the different clocks (e.g., a packet departure time point measured with on a CPU clock of the transmitter and a packet arrival time point measured with a CPU clock of the receiver). One of the major causes of errors in the forward OTT measurement is a clock skew between the clock of the transmitter and the clock of the receiver. The clock skew represents a difference between a rate of increase in local time of the transmitter and a rate of increase in local time of the receiver.

For example, even if the operating rate of the clock of the transmitter is slightly different from that of the clock of the receiver, there is a real difference between the increment in local time of the transmitter and the increment in local time of the receiver. Accordingly, with two local time points being respectively represented by the clock of the transmitter and the clock the receiver at a globally identical time point, the gap between the local time points grows larger with the lapse of global time. For example, if the queuing delay is 0 at certain two time points, each of the $OTT^f$ values measured at the two time points (i.e., $baseOTT^f$) is different due to the clock skew. Such difference may cause a significant error in the forward OTT measurement.

An estimate of the forward queuing delay would not be valid if an OTT measurement error arises from the clock skew. In particular, when the computer network is used for a real time application such as Voice-over-IP or Video-over-IP, the incorrectly estimated value of the forward queuing delay may hamper the task of fulfilling a service quality demand of the application.

SUMMARY

A clock skew may not be a source of errors in RTT measurement, but may cause errors in OTT measurement (for example, errors in forward OTT measurement). Accordingly, in order to estimate a queuing delay from OTT measurements, it is critical to correct an error due to a clock skew. A conventional method of eliminating such an error calculates an absolute value of a clock skew. However, a precise calculation of the absolute value of the clock skew requires the use of an algorithm for, e.g., linear regression analysis or linear programming. This type of algorithm, which should take a large number of samples collected over a considerable period of time, has a high complexity of, e.g., $O(N^2)$. In addition, the algorithm is difficult to apply to real time data transmission. Furthermore, even if, at a certain time point, the calculated absolute value of the clock skew slightly deviates from the actual one thereof, such deviation may cause great errors in estimating a queuing delay after the time point, and therefore poor performance in transmission control.

Disclosed embodiments employ mechanisms for estimating a forward queuing delay and also reducing possible errors in the estimation of the queuing delay by sequentially measuring an RTT and a backward OTT as well as a forward OTT and, for each measurement time point, updating the measured RTT value, the measured forward OTT value and/or the measured backward OTT value to minimize an error caused by a clock skew. While an approach that uses an absolute value of the clock skew to estimate the queuing delay obtains a large number of measurement samples and then performs sophisticated calculations, the above mechanism uses a fewer number of measurement samples and yields an estimate of the queuing delay with an improved error bound for each measurement time point for measuring the RTT, the forward OTT and the backward OTT.

According to an exemplary embodiment, there is provided a method of estimating a queuing delay, the method including: obtaining values in association with a data transmission between a transmitter and a receiver, during an interval from a first measurement time point to a second measurement time point, including: measuring round trip time (RTT) values to provide measured RTT values, and taking a minimum one of the measured RTT values as a RTT reference value, measuring forward one-way transmit time (OTT) values to provide measured forward OTT values, and taking a minimum one of the measured forward OTT values of the interval as a forward OTT reference value, and measuring backward OTT values to provide measured backward OTT values, and taking a minimum one of the measured backward OTT values of the interval as a backward OTT reference value, wherein the forward OTT reference value and the backward OTT reference value constitute two OTT reference values; and updating at least one of the two OTT reference values, including: determining a rate of increment, in a local time of the transmitter, as a first increment rate; determining a rate of increment, in a local time of the receiver, as a second increment rate, wherein the first increment rate and the second increment rate constitute increment rates; making a determination as to which one of the increment rates is a largest increment rate; in accordance with the largest increment rate, selecting for update one of the two OTT reference values; and updating the selected one of the two OTT reference values based on the RTT reference value.

The selected one of the two OTT reference values may be updated based on also the unselected one the two OTT reference values.

The measured forward OTT values and the measured backward OTT values may be measured from the first measurement time point to the second measurement time point.

The method may further include, after the updating of the at least one of the two OTT reference values, performing at least one of: estimating a forward queuing delay, associated with the data transmission, based on: the forward OTT reference value, and the one of the measured forward OTT values measured at the second measurement time point; and estimating a backward queuing delay, associated with the data transmission, based on the backward OTT reference value, and the one of the measured the backward OTT values measured at the second measurement time point.

The method may further include: when the first increment rate is the largest increment rate, setting the backward OTT reference value as the one of the two OTT reference values selected for update, and performing the updating based also on the forward OTT reference value; and when the second increment rate is the largest increment rate, setting the forward OTT reference value as the one of the two OTT reference values selected for updating, and performing the updating based also on the backward OTT reference value.

The determination may include: identifying, as a forward OTT reference time point, a point in time corresponding to the measuring of the minimum one of the measured forward OTT values; identifying, as a backward OTT reference time point, a point in time corresponding to the measuring of the minimum one of the measured backward OTT values; when the forward OTT reference time point is the second measurement time point: determining a first time difference between the second measurement time point and the backward OTT reference time point, and making a first determination as to whether the first time difference exceeds a threshold; and when the backward OTT reference time point is the second measurement time point: determining a second time difference between the second measurement time point and the forward OTT reference time point, and making a second determination as to whether the second time difference exceeds the threshold.

The method may further include: when the first determination is affirmative, updating the backward OTT reference value based on the RTT reference value and the forward OTT reference value; and when the second determination is affirmative, updating the forward OTT reference value based on the RTT reference value and the backward OTT reference value.

The RTT reference value may be set to the one of the measured RTT values corresponding to the first measurement time point.

The method may further include: measuring, at a measurement time point later in time than the second measurement time point, an additional measured forward OTT value, an additional measured backward OTT value and an additional measured RTT value associated with the data transmission; and when the additional measured RTT value is larger than the RTT reference value, repeating the obtaining and the updating.

The method may further include: setting an additional forward OTT reference value as the one of the measured forward OTT values corresponding to the first measurement time point; setting an additional backward OTT reference value as the one of the measured backward OTT values corresponding to the first measurement time point; determining a forward OTT reference difference value by calculating a difference between the additional forward OTT reference value and the forward OTT reference value; and determining a backward OTT reference difference value by calculating a difference between the additional backward OTT reference value and the forward OTT reference value; wherein the determination of the largest increment rate includes comparing the forward OTT reference difference value with a sum of the backward OTT reference difference value and a predetermined threshold value.

The method may further include: when the forward OTT reference difference value is larger than the sum, updating the RTT reference value based on the backward OTT reference difference value, and then updating the additional backward OTT reference value to the backward OTT reference value; and when the forward OTT reference difference value is smaller than the sum, updating the RTT reference value based on the forward OTT reference difference value, and then updating the additional forward OTT reference value to the forward OTT reference value.

The updating may include: identifying a predetermined measurement time point in the interval between the first measurement time point and the second measurement time point, wherein an interval between the predetermined measurement time point and the second measurement time point constitutes a second interval; taking a minimum one of the measured forward OTT values of the second interval as yet another forward OTT reference value; taking a minimum one of the measured backward OTT values of the second interval as yet another backward OTT reference value; when the forward OTT reference difference value is larger than the sum, updating the yet another backward OTT reference value, and then updating the backward OTT reference value based on the RTT reference value, the forward OTT reference value, and the yet another backward OTT reference value; and when the forward OTT reference difference value is smaller than the sum, updating the yet another forward OTT reference value, and then updating the forward OTT reference value based on the RTT reference value, the backward OTT reference value, and the yet another forward OTT reference value.

According to another exemplary embodiment, there is provided a computer readable recording medium having computer executable instructions stored thereon which, when executed by a hardware processor, enables the hardware processor to implement operations, comprising: obtaining values in association with a data transmission between a transmitter and a receiver, during an interval from a first measurement time point to a second measurement time point, including: measuring round trip time (RTT) values to provide measured RTT values, and taking a minimum one of the measured RTT values as a RTT reference value, measuring forward one-way transmit time (OTT) values to provide measured forward OTT values, and taking a minimum one of the measured forward OTT values of the interval as a forward OTT reference value, and measuring backward OTT values to provide measured backward OTT values, and taking a minimum one of the measured backward OTT values of the interval as a backward OTT reference value, wherein the forward OTT reference value and the backward OTT reference value constitute two OTT reference values; updating at least one of the two OTT reference values, including: determining a rate of increment, in a local time of the transmitter, as a first increment rate; determining a rate of increment, in a local time of the receiver, as a second increment rate, wherein the first increment rate and the second increment rate constitute increment rates; making a determination as to which one of the increment rates is a largest increment rate; in accordance with the largest increment rate, selecting for update one of the two OTT reference values; and updating the selected one of the two OTT reference values based on the RTT reference value.

According to yet another exemplary embodiment, there is provided an apparatus for estimating a queuing delay, the apparatus including: a reference value collecting unit configured to perform an operation of obtaining values in association with a data transmission between a transmitter and a receiver, during an interval from a first measurement time point to a second measurement time point, including: measuring round trip time (RTT) values to provide measured RTT values, and taking a minimum one of the measured RTT values as a RTT reference value, measuring forward one-way transmit time (OTT) values to provide measured forward OTT values, and taking a minimum one of the measured forward OTT values of the interval as a forward OTT reference value, and measuring backward OTT values to provide measured backward OTT values, and taking a minimum one of the measured backward OTT values of the interval as a backward OTT reference value, wherein the forward OTT reference value and the backward OTT reference value constitute two OTT reference values; and an updating unit configured to perform an operation of updating at least one of the two OTT reference values, including: determining a rate of increment, in a local time of the transmitter, as a first increment rate; determining a rate of increment, in a local time of the receiver, as a second increment rate, wherein the first increment rate and the second increment rate constitute increment rates; making a determination as to which one of the increment rates is a largest increment rate; in accordance with the largest increment rate, selecting for update one of the two OTT reference values; and updating the selected one of the two OTT reference values based on the RTT reference value, wherein at least one of the reference value collecting unit and the updating unit is implemented using a hardware processor.

The selected one of the two OTT reference values may be updated based on also the unselected one the two OTT reference values.

The measured forward OTT values and the measured backward OTT values may be measured from the first measurement time point to the second measurement time point.

The apparatus may further include: a queuing delay estimating unit configured to perform, after the updating of the at least one of the two OTT reference values, performing at least one of: estimating a forward queuing delay, associated with the data transmission, based on the forward OTT reference value, and the one of the measured forward OTT values measured at the second measurement time point; and estimating a backward queuing delay, associated with the data transmission, based on the backward OTT reference value, and the one of the measured the backward OTT values measured at the second measurement time point.

The apparatus may further include: when the first increment rate is the largest increment rate, setting the backward OTT reference value as the one of the two OTT reference values selected for update, and performing the updating based also on the forward OTT reference value; and when the second increment rate is the largest increment rate, setting the forward OTT reference value as the one of the two OTT reference values selected for updating, and performing the updating based also on the backward OTT reference value.

The determination may include: identifying, as a forward OTT reference time point, a point in time corresponding to the measuring of the minimum one of the measured forward OTT values; identifying, as a backward OTT reference time point, a point in time corresponding to the measuring of the minimum one of the measured backward OTT values; when the forward OTT reference time point is the second measurement time point: determining a first time difference between the second measurement time point and the backward OTT reference time point, and making a first determination as to whether the first time difference exceeds a threshold; and when the backward OTT reference time point is the second measurement time point: determining a second time difference between the second measurement time point and the forward OTT reference time point, and making a second determination as to whether the second time difference exceeds the threshold.

The apparatus may further include: when the first determination is affirmative, updating the backward OTT reference value based on the RTT reference value and the forward OTT reference value; and when the second determination is affirmative, updating the forward OTT reference value based on the RTT reference value and the backward OTT reference value.

The RTT reference value may be set to the one of the measured RTT values corresponding to the first measurement time point.

The reference value collecting unit may be further configured to measure, at a measurement time point later in time than the second measurement time point, an additional measured forward OTT value, an additional measured backward OTT value and an additional measured RTT value associated with the data transmission, and when the additional measured RTT value is larger than the RTT reference value, the reference value collecting unit may repeat the obtaining operation and the reference value updating unit repeats the updating operation.

The reference value collecting unit may be further configured to set an additional forward OTT reference value as the one of the measured forward OTT reference values corresponding to the first measurement time point, set an additional backward OTT reference value as the one of the measured backward OTT values corresponding to the first measurement time point, determine a forward OTT reference difference value by calculating a difference between the additional forward OTT reference value and the forward OTT reference value, and determine a backward OTT reference difference value by calculating a difference between the additional backward OTT reference value and the forward OTT reference value; and wherein the determination of the largest increment rate comprises includes comparing the forward OTT reference difference value with a sum of the backward OTT reference difference value and a predetermined threshold value.

The reference value updating unit may be further configured to, when the forward OTT reference difference value is larger than the sum, update the RTT reference value based on the backward OTT reference difference value, and then update the additional backward OTT reference value to the backward OTT reference value, and to, when the forward OTT reference difference value is smaller than the sum, update the RTT reference value based on the forward OTT reference difference value, and then update the additional forward OTT reference value to the forward OTT reference value.

The updating operation may include: identifying a predetermined measurement time point in the interval between the first measurement time point and the second measurement time point, wherein an interval between the predetermined measurement time point and the second measurement time point constitutes a second interval; taking a minimum one of the measured forward OTT values of the second interval as yet another forward OTT reference value; taking a minimum one of the measured backward OTT values of the second interval as yet another backward OTT reference value; when the forward OTT reference difference value is larger than the sum, updating the yet another backward OTT reference value, and then updating the backward OTT reference value based on the RTT reference value, the forward OTT reference value, and the yet another backward OTT reference value; and when the forward OTT reference difference value is smaller than the sum, updating the yet another forward OTT reference value, and then updating the forward OTT reference value based on the RTT reference value, the backward OTT reference value, and the yet another forward OTT reference value

BRIEF DESCRIPTION OF THE DRAWINGS

The above and other objects, features and advantages of the present disclosure will become more apparent to those familiar with this field from the following detailed description when taken in conjunction with the accompanying drawings, in which:

FIG. 4 shows a pseudo code representing a process for estimating a queuing delay according to an exemplary embodiment of the present disclosure;

FIG. 5 shows a pseudo code representing an alternative process for estimating a queuing delay according to an exemplary embodiment of the present disclosure;

FIG. 6 is a modified version of the pseudo code shown in FIG. 5;

DETAILED DESCRIPTION OF EXEMPLARY EMBODIMENTS

Exemplary embodiments of the present disclosure will be described below in more detail with reference to the accompanying drawings. The following detailed descriptions are provided to assist the reader in gaining a comprehensive understanding of the methods, apparatuses, and/or systems described herein. However, the embodiments are merely examples and are not to be construed as limiting the present disclosure.

Various details already understood by those familiar with this field may be omitted to avoid obscuring the gist of the present disclosure. Terminology described below is defined considering functions in the present disclosure and may vary according to a user's or operator's intention or usual practice. Thus, the meanings of the terminology should be interpreted based on the overall context of the present specification. The terminology used in the description is intended to describe embodiments of the present disclosure only, and shall by no means be restrictive. Unless clearly used otherwise, expressions in a singular form include a meaning of a plural form. In the present description, an expression such as "comprising" or "including" is intended to designate a characteristic, a number, a step, an operation, an element, a part or combinations thereof, and shall not be construed to preclude any presence or possibility of one or more other characteristics, numbers, steps, operations, elements, parts or combinations thereof.

Figure 1:
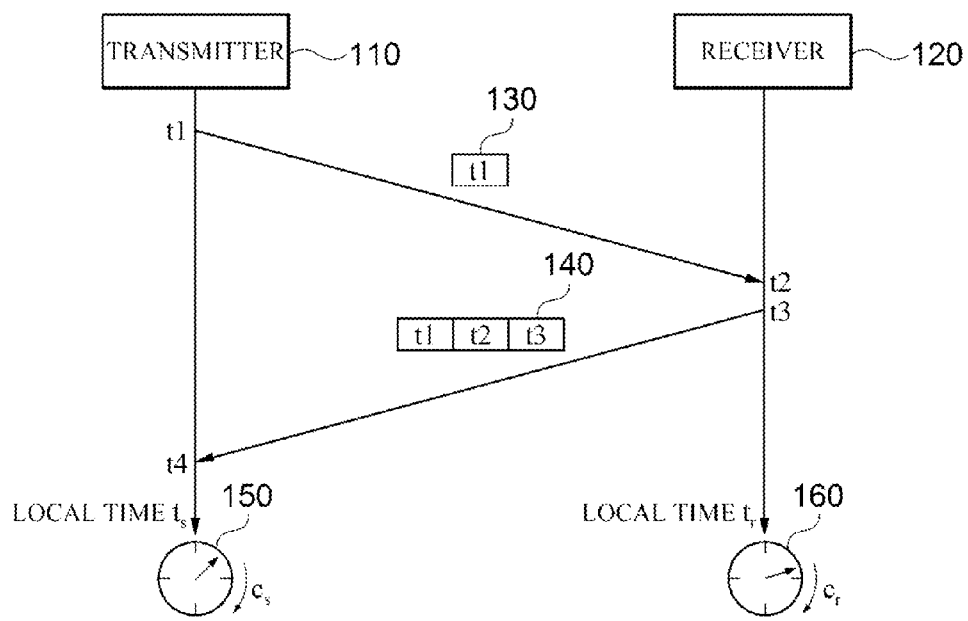
FIG. 1 illustrates a network environment according to an exemplary embodiment of the present disclosure.

FIG. 1 illustrates a network environment according to an exemplary embodiment of the present disclosure.

As shown in FIG. 1, a network environment 100 includes computing devices that perform packet-based communication. The computing devices in the network environment 100 include a transmitter 110 that transmits a data packet and a receiver 120 that receives the data packet. The transmitter 110 and the receiver 120 respectively operate a clock 150 and a clock 160, independently of each other. In the transmitter 110, a local time $t_s$ passes according to the clock 150. In the receiver 120, a local time $t_r$ passes according to the clock 160. A rate of increase in the local time $t_s$ of the transmitter 110 is Cs, and a rate of increase in the local time $t_r$ of the receiver 120 is Cr.

The transmitter 110 delivers a timestamp 130 to the receiver 120 while transmitting a data packet to the receiver 120. The timestamp 130 may be included in the data packet, and alternatively, may be transmitted separately from the data packet. The timestamp 130 indicates a time point, measured using the clock 150 of the transmitter 110 to be the local time ts=t1, at which the data packet is transmitted from the transmitter 110.

The receiver 120 transmits timestamps 140 together with a response packet in response to receiving the data packet transmitted from the transmitter 110. The timestamps 140 may be included in the response packet, and alternatively, may be transmitted separately from the response packet. The timestamps 140 include timestamps respectively indicating the local time $t_r$=t2 and the local time $t_r$=t3 measured using the clock 160 of the receiver 120, and may further include a timestamp indicating t1. The local time t2 is a measured value of a time point at which the data packet transmitted from the transmitter 110 is received by the receiver 120, and the local time t3 is a measured value of a time point at which the response packet is transmitted from the receiver 120.

In response to receiving the response packet transmitted from the receiver 120, the transmitter 110 uses the clock 150 to measure a time point at which the response packet is received by the transmitter 110 to be the local time $t_s$=t4. On an as-needed basis, another timestamp (not shown) indicating t4 may be transmitted from the transmitter 110 to a different computing device (for example, the receiver 120).

Figure 2:
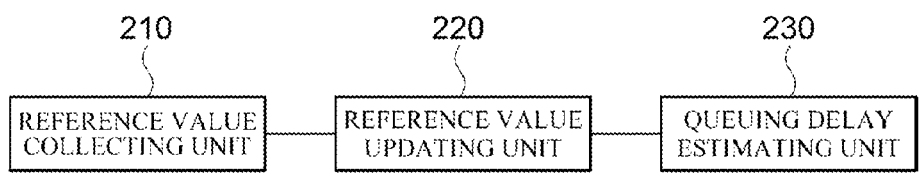
FIG. 2 illustrates an apparatus for estimating a queuing delay according to an exemplary embodiment of the present disclosure.

In certain exemplary embodiments, at least one of the computing devices included in the network environment 100 (for example, the transmitter 110) may include an apparatus for controlling data transmission between the transmitter 110 and the receiver 120 based on measured values of t1, t2, t3 and t4. FIG. 2 illustrates such an apparatus for estimating a queuing delay.

The queuing delay estimation apparatus 200 shown in FIG. 2 includes a reference value collecting unit 210, a reference value updating unit 220 and a queuing delay estimating unit 230.

The reference value collecting unit 210 obtains measured values of t1, t2, t3 and t4. At a predetermined measurement time t, based on the measured values, the reference value collecting unit 210 obtains a measured value of an RTT, a measured value of a forward OTT and a measured value of a backward OTT, which are denoted as RTT(t), $OTT^f(t)$ and $OTT^b(t)$, respectively, as shown in Equation 1 below. According to a certain exemplary embodiment, the reference value collecting unit 210 repeats the measurement of the RTT, the forward OTT and the backward OTT for each successive measurement time point.

$$RTT(t)=(t4-t1)-(t3-t2)$$

$$OTT^f(t)=t2-t1$$

$$OTT^b(t)=t4-t3 \quad \text{[Equation 1]}$$

Then, for the measurement time point t, the reference value collecting unit 210 may obtain a minimum value among RTT values measured over a time interval from a preceding measurement time point to the measurement time point t, a minimum value among forward OTT values measured over the time interval, and a minimum value among backward OTT values measured over the time interval, since the reference value collecting unit 210 has obtained the measured values of the RTT, the forward OTT and the backward OTT associated with data transmission from the transmitter 110 to the receiver 120 during the time interval. According to a certain exemplary embodiment, the preceding measurement time point may be a time point t=0 at which the measurement of the RTT, the forward OTT and the backward OTT starts. According to another exemplary embodiment, the preceding measurement time may be a time point t=s (s>0) which precedes the measurement time point t. According to still another exemplary embodiment, it is not necessary for the reference value collecting unit 210 to obtain RTT values, forward OTT values and backward OTT values over a same time interval and obtain a minimum value among the RTT values, a minimum value among the forward OTT values and a minimum value among the backward OTT values over the same time interval. For instance, the reference value collecting unit 210 may obtain a minimum value among the RTT values measured from the time point 0 to the time point t, a minimum value among the forward OTT values measured from the time point s to the time point t, and a minimum value among the backward OTT values measured from the time point s to the time point t.

As described above, in a certain exemplary embodiment, the reference value collecting unit 210 calculates a minimum value RTTmin(0, t) among the RTT values measured over the time interval from the time point 0, which is a starting time point of the measurement of the RTT, the forward OTT and the backward OTT, to the time point t. For the time point t, a queuing delay Qdelay(t) can be regarded as having a value of RTT(t), minus a value of the RTT that would be measured when a queuing delay is 0 (i.e., baseRTT). However, it is unlikely for the transmitter 110 or the receiver 120 in the network environment 100 to have direct knowledge of baseRTT. Instead, RTTmin(0, t) may serve as an estimate of baseRTT. It should be noted that although the queuing delay Qdelay (t) may be estimated to be RTT(t) minus RTTmin(0, t), the queuing delay Qdelay(t) includes a forward queuing delay $Qdelay^f(t)$ and a backward queuing delay $Qdelay^b(t)$.

Further, at the time point t, the reference value collecting unit 210 obtains a minimum value $OTT^f min(0, t)$ among the forward OTT values measured over the aforementioned time interval, and a minimum value $OTT^b min(0, t)$ among the backward OTT values measured over the time interval.

For instance, when $baseOTT^f(t)$ denotes a forward OTT that would be measured when a queuing delay is 0 at the time point t, the forward queuing delay at the time point t, i.e, $Qdelay^f(t)$, can be regarded as having a value of $OTT^f(t)$ minus $baseOTT^f(t)$. Similarly, when $baseOTT^b(t)$ denotes a backward OTT that would be measured when a queuing delay is 0 at the time point t, the backward queuing delay at the time point t, i.e., $Qdelay^b(t)$, can be regarded as having a value of $OTT^b(t)$ minus $baseOTT^b(t)$. As described above, however, it is unlikely for the transmitter 110 or the receiver 120 in the network environment 100 to have direct knowledge of $baseOTT^f(t)$ and $baseOTT^b(t)$. Instead, $baseOTT^f(t)$ and $baseOTT^b(t)$ may be estimated to be $OTT^f min(0, t)$ and $OTT^b min(0, t)$, respectively.

In this example, for the time point t, the queuing delay estimating unit 230 may obtain an estimate $Qdelay^f(t)$ of the forward queuing delay and an estimate $Qdelay^b(t)$ of the backward queuing delay, as shown in Equation 2 below.

$$Qdelay^f(t) = OTT^f(t) - OTT^f min(0,t)$$

$$Qdelay^b(t) = OTT^b(t) - OTT^b min(0,t) \quad \text{[Equation 2]}$$

If there is no clock skew between the transmitter 110 and the receiver 120, $baseOTT^f(t)$ and $baseOTT^b(t)$ at any time point may be constants $baseOTT^f$ and $baseOTT^b$, respectively, and as time passes by, $OTT^f min(0, t)$ and $OTT^b min(0, t)$ are approximated to $baseOTT^f$ and $baseOTT^b$, respectively, with a significant level of accuracy. Meanwhile, as will be described later, if there is a clock skew between the transmitter 110 and the receiver 120, $baseOTT^f(t)$ and $baseOTT^b(t)$ are not constants, and a huge difference may arise between $OTT^f min(0, t)$ and $baseOTT^f$ or between $OTT^b min(0, t)$ and $baseOTT^b$. The reference value updating unit 220 of the exemplary queuing delay estimation apparatus 200 performs certain operations to reduce errors caused by the clock skew.

Queuing Delay Estimation Errors Due to a Clock Skew

Figure 3:
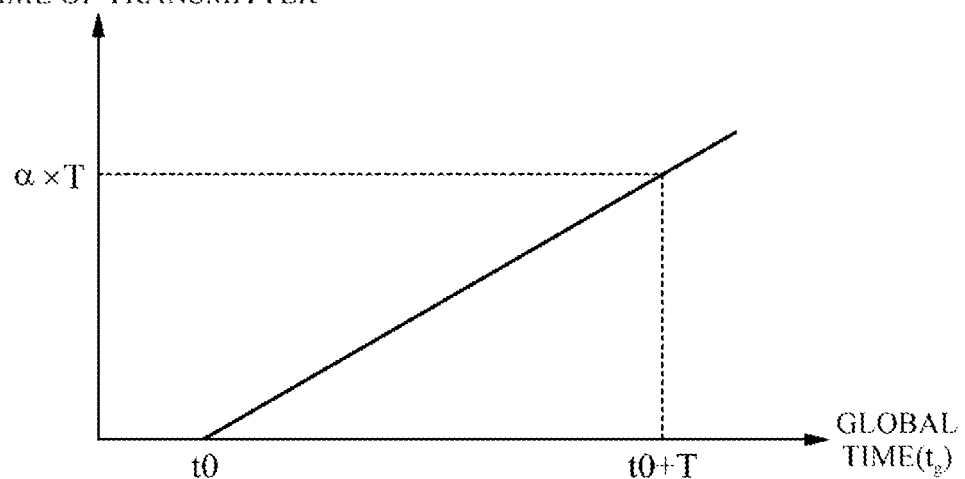
FIG. 3 is a diagram for describing a clock skew between a transmitter and a receiver according to an exemplary embodiment of the present disclosure.

FIG. 3 is a diagram for describing a clock skew between a transmitter and a receiver according to an exemplary embodiment of the present disclosure.

It is assumed that the transmitter 110 has the same local time as the receiver 120 at global time $t_g = t0$. The clock 150 of the transmitter 110 increases the local time of the transmitter 110 at an increment rate of Cs, and the clock 160 of the receiver 120 increases the local time of the receiver 120 at an increment rate of Cr, such that a clock skew α between the transmitter 110 and the receiver 120 is given as Equation 3 below.

$$\alpha = Cr - Cs \quad \text{[Equation 3]}$$

Accordingly, at global time tg=t0+T, a difference in local time between the transmitter 110 and the receiver 120 has a magnitude of $|\alpha \times T|$. For example, FIG. 3 illustrates a difference in local time between the receiver 120 and the transmitter 110 when α>0. With reference to FIG. 3, it can be understood that even if the same amount of network congestion occurs on a forward path at the global time tg=t0 and the global time tg=t0+T, a forward OTT measured at the global time tg=t0+T is larger than a forward OTT measured at the global time tg=t0. This is because a time point at which a data packet departs from the transmitter 110 is measured by the clock 150 of the transmitter 110, a time point at which the data packet arrives at the receiver 120 is measured by the clock 160 of the receiver 120, and a forward OTT is measured by obtaining a difference between the two measured values.

Further, when α>0, $OTTmin^f(0, t)$ may not be changed any more as time elapses. For instance, it is likely that, at a time point at which an enormous difference is made between the local time of the transmitter 110 and the local time of the receiver 120 due to the clock skew (α>0) (for example, at a time point t), $OTT^f(t)$ would not be smaller than $OTTmin^f(0, s)$ (where 0<s<t) and $OTTmin^f(0, t)$ remains $OTTmin^f(0, s)$. Meanwhile, the clock skew (α>0) increases $baseOTT^f(t)$ as time passes by. As a result, in Equation 2, estimating $OTTmin^f(0, t)$ as $baseOTT^f(t)$ leads to an underestimation of $baseOTT^f(t)$ and an overestimation of $Qdelay^f(t)$.

On the contrary, when α<0, a forward OTT value measured on the forward path in the same state as above becomes smaller as time elapses. Accordingly, $baseOTT^f(t)$ is decreased with the lapse of time, and estimating $OTTmin^f(0, t)$ as $baseOTT^f(t)$ provides a sufficient level of accuracy.

When α<0, a backward queuing delay $Qdelay^b(t)$ may be an overestimate. This is because it is likely that, at a time point at which a huge difference is made between the local time of the transmitter 110 and the local time of the receiver 120 due to the clock skew (α<0) (for example, a time point t), $baseOTT^b(t)$ is considerably increased and the gap between $OTTmin^b(0, t)$ and $baseOTT^b(t)$ is increased as much as the increase in $baseOTT^b(t)$. Meanwhile, when α>0, estimating $OTTmin^b(0, t)$ as $baseOTT^b(t)$ provides a sufficient level of accuracy.

Techniques for Reducing Queuing Delay Estimation Errors Due to a Clock Skew

According to the techniques described below as examples, the above-mentioned estimation errors may be reduced. For instance, the reference value updating unit 220 of the queuing delay estimation apparatus 200 may perform operations of implementing the exemplary techniques. It is noted that these techniques uses the following:

Even if there is a clock skew (that is, if α≠0), an RTT is measured without being affected by the clock skew, and RTTmin(0, t) is a relatively precise estimate of baseRTT. Accordingly, RTTmin(0, t) may serve as an RTT reference value for estimating a queuing delay.

Even if there is a clock skew, one of $baseOTT^f(t)$ and $baseOTT^b(t)$ may not be affected by the clock skew and may be estimated with a significant level of accuracy. When α>0, $OTTmin^b(0, t)$ is a relatively precise estimate of $baseOTT^b(t)$. When α<0, $OTTmin^f(0, t)$ is a relatively precise estimate of $baseOTT^f(t)$. Accordingly, $OTTmin^f(0, t)$ and $OTTmin^b(0, t)$ may be used as a forward OTT reference value for estimating a forward queuing delay and a backward OTT reference value for estimating a backward queuing delay, respectively.

In a certain exemplary embodiment, when α is smaller than 0, a value of $OTT^b min$ obtained in accordance with Equation 4 below, instead of $OTT^b min(0, t)$, is used as an estimate of $baseOTT^b(t)$ (e.g., for obtaining the backward queuing delay $Qdelay^b(t)$ in Equation 2). That is, a backward OTT reference value is updated as follows.

$$OTT^b min = RTTmin(0,t) - OTTmin^f(0,t) \quad \text{[Equation 4]}$$

Meanwhile, when α is larger than 0, a value of $OTT^f min$ obtained in accordance with Equation 5 below, instead of $OTT^f min(0, t)$, is used as an estimate of $baseOTT^f(t)$ (e.g., for obtaining the forward queuing delay $Qdelay^f(t)$ in Equation 2). That is, a forward OTT reference value is updated as follows.

$$OTT^f min = RTTmin(0,t) - OTTmin^b(0,t) \quad \text{[Equation 5]}$$

Some exemplary embodiments may involve a process of determining whether a clock skew α is larger or smaller than 0 without directly calculating the clock skew α. For instance, according to one of the queuing delay estimation techniques described below, the reference value updating unit 220 of the queuing delay estimation apparatus 200 of FIG. 2 is configured to determine whether a rate of increment in the local time of the transmitter 110 is larger or smaller than a rate of increment in the local time of the receiver 120 (that is, whether a clock skew α is larger or smaller than 0), and in accordance with the determination, update one of a forward OTT reference value and a backward OTT reference value. Such updating is performed on an RTT reference value, and may be performed further based on the other of the forward OTT reference value and the backward OTT reference value.

FIG. 4 shows a pseudo code representing a process for estimating a queuing delay according to an exemplary embodiment of the present disclosure.

In accordance with the pseudo code of FIG. 4, a process may be performed for each time point t at which a measured RTT value RTT(t), a measured forward OTT value $OTT^f(t)$ and a measured backward OTT value $OTT^b(t)$ are obtained.

As shown in the first to third lines of the pseudo code of FIG. 4, RTTmin may be updated to represent a minimum value among RTT values measured from a time point 0, which is a starting time point for the RTT measurement, to a time point t. In other words, RTTmin is a variable that is set to represent RTTmin(0, t).

As shown in the fourth and fifth lines of the pseudo code of FIG. 4, $OTT^f min$, if larger than $OTT^f(t)$, is updated to $OTT^f(t)$. As shown in the eleventh and twelfth lines of the pseudo code of FIG. 4, $OTT^b min$, if larger than $OTT^b(t)$, is updated into $OTT^b(t)$. That is, $OTT^f min$ and $OTT^b min$ are variables that are set to represent $OTT^f min(0, t)$ and $OTT^b min(0, t)$, respectively.

The sixth to tenth lines and the thirteenth to seventeenth lines of the pseudo code of FIG. 4 show exemplary operations of determining whether a clock skew α is larger or smaller than 0 and selectively updating $OTT^f min$ and $OTT^b min$. For example, when α>0, while baseRTT remains unchanged, $baseOTT^f(t)$ increases and, accordingly, $baseOTT^b(t)$ decreases as much as the increase in $baseOTT^f(t)$. As time elapses, it is likely that $OTT^f min$ fails to approximate increasing $baseOTT^f(t)$ and still remains unchanged, whereas $OTT^b min$ may be a relatively precise estimate of decreasing $baseOTT^b(t)$. Accordingly, unlike $OTT^f min$, $OTT^b min$ is likely to be consistently updated. This implies that $OTT^f min$ would not be updated near the time point at which $OTT^b min$ is updated. When α<0, while baseRTT remains unchanged, $baseOTT^b(t)$ increases and, accordingly, $baseOTT^f(t)$ decreases as much as the increase in $baseOTT^b(t)$. As time elapses, it is likely that $OTT^b min$ is not updated while $OTT^f min$ is frequently updated. Accordingly, it is fairly reasonable to determine that α<0 if $OTT^b min$ is not updated near the time point at which $OTT^f min$ is updated.

The operations of the selective updating presented in the sixth to tenth lines and the thirteenth to seventeenth lines of the pseudo code of FIG. 4 are based on the foregoing. The sixth to tenth lines of the pseudo code of FIG. 4 show operations which are performed when $OTT^f min$ is updated. These operations include an operation of updating $OTT^b min$ to RTTmin minus $OTT^f min$ when it is determined that a threshold value T is exceeded by a time difference between the time point at which $OTT^b min$ is finally updated and the time point t, and an operation of recoding the time point at which $OTT^f min$ is finally updated as the time point t. That is, if the time difference is larger than the threshold value T, it can be determined that α<0. The operations in the thirteenth to seventeenth lines of the pseudo code of FIG. 4 are performed when $OTT^b min$ is updated. These operations include an operation of updating $OTT^f min$ to RTTmin minus $OTT^b min$ when it is determined that the threshold value T is exceeded by a time difference between the time point at which $OTT^f min$ is finally updated and the time point t, and an operation of recoding the time point at which $OTT^f min$ is finally updated as the time point t. That is, when the time difference is larger than the threshold value T, it can be determined that α>0.

When the exemplary process shown in the pseudo code of FIG. 4 is completed, an estimate of a queuing delay (for example, a forward queuing delay) which is calculated based on $OTT^f min$ and $OTT^b min$ may have a reduced error bound. When RTTmin=baseRTT+$\Delta_1$, $OTT^f min$=$baseOTT^f(t)$+$\Delta_2$ and $OTT^b min$=$baseOTT^b(t)$+$\Delta_3$ before the selective updating of $OTT^f min$ and $OTT^b min$ is performed, the pseudo code of FIG. 4 provides $OTT^f min$ and $OTT^b min$ having the error bounds as shown in Equation 6 below.

$$OTT^f min = baseOTT^f(t) + \Delta^f$$

$$OTT^b min = baseOTT^b(t) + \Delta^b \quad \text{[Equation 6]}$$

In Equation 6, $\Delta^f \geq 0$ and $\Delta^b \geq 0$, $\Delta^f = \Delta_1 - \Delta_3$ and $\Delta^b = \Delta_3$ if α>0, and $\Delta^f = \Delta_2$ and $\Delta^b = \Delta_1 - \Delta_2$ if α<0.

FIG. 5 shows a pseudocode representing an alternative process for estimating a queuing delay according to an exemplary embodiment of the present disclosure.

In accordance with the pseudo code of FIG. 5, a process may be performed for each time point at which a measured RTT value RTT(t), a measured forward OTT value $OTT^f(t)$ and a measured backward OTT value $OTT^b(t)$ are obtained.

As shown in the first and second lines of the pseudo code of FIG. 5, RTTmin may be updated to represent a minimum value among RTT values measured from a starting time point for the RTT measurement to a time point t. In other words, RTTmin is a variable that is used to store aforementioned RTTmin(0, t). When a time point at which RTTmin is most recently updated is s(s<t), it will be understood that RTTmin (0, t) has the same value as RTTmin(s, t) (i.e., the value measured at the time point s). Accordingly, similarly to RTTmin(0, t), RTTmin(s, t) also serves as an RTT reference value.

As shown in the third and fourth lines of the pseudo code of FIG. 5, when RTTmin is updated, a variable $RTT^f min$ is given a value of $OTT^f(t)$, and a variable $RTT^b min$ is given a value of $OTT^b(t)$. That is, $RTT^f min$ and $RTT^b min$ are set to a forward OTT and a backward OTT, respectively, which are measured at the recent time point s at which RTTmin is recently updated.

The third to twelfth lines of the pseudo code of FIG. 5 show how variables $OTT^f min$ and $OTT^b min$ are updated. As shown in the third and fourth lines of FIG. 5, when RTTmin is updated, the variable $OTT^f min$ is given a value of $OTT^f(t)$, and the variable $OTT^b min$ is given a value of $OTT^b(t)$. As shown in the fifth to twelfth lines of the pseudo code of FIG. 5, when RTTmin is not updated, $OTT^f min$, if larger than $OTT^f(t)$, is updated into $OTT^f(t)$ and $OTT^b min$, if larger than $OTT^b(t)$, is updated into $OTT^b(t)$. The relationship between $RTT^f$min and $OTT^f$min and that between $RTT^b$min and $OTT^b$min are shown in Equation 7 below.

$$RTT^f\text{min} \geq OTT^f\text{min}$$

$$RTT^b\text{min} \geq OTT^b\text{min} \qquad \text{[Equation 7]}$$

In sum, $OTT^f$min is a variable that represents a minimum value among $OTT^f$ values measured from the time point s at which RTTmin is most recently updated and the time point t, and $OTT^b$min is a variable that represents a minimum value among $OTT^b$ values measured from the time point s at which RTTmin is most recently updated and the time point t. In view of the foregoing, $OTT^f$min and $OTT^b$min are not always the same as $OTT^f$min(0, t) and $OTT^b$min(0, t), respectively, which are mentioned earlier. Rather, $OTT^f$min and $OTT^b$min store $OTT^f$min(s, t) and $OTT^b$min(s, t), respectively. However, neither of a difference between baseOTT$^f$(t) and OTT-min$^f$(s, t) and a difference between baseOTT$^b$(t) and OTT-min$^b$(s, t) is great. This is because, in view that estimating baseRTT from RTTmin exhibits a certain degree of accuracy, neither of a difference between baseOTT$^f$(t) and RTT$^f$min and a difference between baseOTT$^b$(t) and RTT$^b$min would not be large. Accordingly, instead of OTT$^f$min(0, t) and OTT$^b$min(0, t), OTTmin$^f$(s, t) and OTTmin$^b$(s, t) may serve as a forward OTT reference value for estimating a forward queuing delay and a backward OTT reference value for estimating a backward queuing delay, respectively. In addition, RTT$^f$min and RTT$^b$min may be used as another forward OTT reference value and another backward reference value, respectively.

As shown in the thirteenth to seventeenth lines of the pseudo code of FIG. 5, it is determined whether a clock skew $\alpha$ is larger than or smaller than 0. The thirteenth to fifteenth lines of the pseudo code of FIG. 5 show a criterion for the determination. A threshold value $\theta$ represents a maximum tolerable error bound. For convenience of illustration, it is assumed that A=(RTT$^f$min−OTT$^f$min) and B=(RTT$^b$min−OTT$^b$min). In view that RTT$^f$min and RTT$^b$min are associated with a forward OTT and a backward OTT, respectively, A and B may be referred to as a forward OTT reference difference value and a backward OTT reference difference value, respectively. In the exemplary process presented in the pseudo code of FIG. 5, it is regarded that A−B>θ represents that α<0 and A−B<θ represent that α>0. For example, if α>0, it is likely that after the recent time point at which RTTmin is updated, OTT$^f$min fails to approximate increasing baseOTT$^f$(t) and still remains unchanged, whereas OTT$^b$min may be a relatively precise estimate of decreasing baseOTT$^b$(t). Accordingly, it is fairly reasonable to determine that α>0 if the difference between RTT$^b$min and OTT$^b$min is larger than the difference between RTT$^f$min and OTT$^f$min by a threshold value. Likewise, it can be determined that α<0 if the difference between RTT$^b$min and OTT$^b$min is smaller than the difference between RTT$^f$min and OTT$^f$min by the threshold value.

As shown in the thirteenth and fourteenth lines of the pseudo code of FIG. 5, if A−B>θ, OTT$^b$min is changed into a value of RTTmin minus OTT$^f$min. As shown in the fifteenth and sixteenth lines of the pseudo code of FIG. 5, if A−B<θ, OTT$^f$min is changed into a value of RTTmin minus OTT$^b$min. Although, prior to such a change, one of OTT$^f$min and OTT$^b$min is an estimate with a relatively high level of accuracy but the clock skew causes the other to be a poor estimate, updating the less accurate estimate based on the more accurate one reduces an error in the queuing delay estimation.

When the exemplary process described in the pseudo code of FIG. 5 is completed, OTT$^f$min and OTT$^b$min each of which has a reduced error bound may be obtained. The error bounds may be expressed as shown in Equation 6. An estimate of a queuing delay calculated based thereupon may have a reduced error.

Further, the process shown in the pseudo code of FIG. 5 may be modified according to at least one scheme for further improving estimation of a queuing delay. FIG. 6 shows a modified version of the pseudo code of FIG. 5. The pseudo code of FIG. 6 shows scheme 1 and scheme 2 that are described below.

First, scheme 1 is implemented as shown in the thirteenth to fifteenth lines and the seventeenth to nineteenth lines of the pseudo code of FIG. 6. Specifically, as shown in the thirteenth to fifteenth lines of the pseudo code of FIG. 6, if A−B>θ, RTTmin is reduced by (RTT$^b$min−OTT$^b$min), and then RTT$^b$min is changed to have a value of OTT$^b$min. As shown in the seventeenth to nineteenth lines of the pseudo code of FIG. 6, if A−B<θ, RTTmin is reduced by (RTT$^f$min−OTT$^f$min), and then RTT$^f$min is changed to have a value of OTT$^f$min.

This scheme is based on the following.

For example, when α>0, after the recent time point s at which RTTmin is updated, OTT$^f$min is equal to or larger than baseOTT$^f$(t) at any time point t. For example, if OTT$^f$min is updated at a time point s+N, Equation 8 below holds.

$$\text{baseOTT}^f(s) \leq \text{baseOTT}^f(s) + N \times \alpha = \text{baseOTT}^f(s+N) \leq OTT^f\text{min} \leq RTT^f\text{min} \qquad \text{[Equation 8]}$$

According to Equation 8, it is found that RTTmin=RTT$^f$min+RTT$^b$min≥OTT$^f$min+RTT$^b$min. Further, since OTT$^f$min=OTT$^f$(s+N) and RTT$^b$min=OTT$^b$(s), it is seen that OTT$^f$min+RTT$^b$min≥baseOTT$^f$(s+N)+baseOTT$^b$(s)≥baseOTT$^f$(s)+baseOTT$^b$(s)=baseRTT.

Therefore, a value of $\Delta_1$, which is a value of RTTmin=RTT$^f$min+RTT$^b$min, minus baseRTT, is equal to or larger than a value of (OTT$^f$min+RTT$^b$min), minus baseRTT. In view of the foregoing, changing RTTmin to (OTT$^f$min+RTT$^b$min), that is, applying OTT$^f$min in place of RTT$^f$min associated with RTTmin may reduce $\Delta_1$, and also reduce $\Delta^f$, an error of OTT$^f$min, according to Equation 6, Similarly, when α<0, applying OTT$^b$min in place of RTT$^b$min associated with RTTmin may reduce $\Delta_1$, and also reduce $\Delta^b$, an error of OTT$^b$min, according to Equation 6.

Scheme 2 is implemented as shown in the sixteenth and twentieth lines of the pseudo code of FIG. 6. The pseudo code of FIG. 6 shows an example in which scheme 2 is employed together with scheme 1. By way of another example, scheme 2 may be employed as an alternative to scheme 1.

According to scheme 2, as shown in the sixteenth line of the pseudo code of FIG. 6, if A−B>θ, OTT$^b$min is changed to a smaller one of a value of RTTmin minus OTT$^f$min and a value of OTT$^b$min(t−N, t). As shown in the twentieth line of the pseudo code of FIG. 6, if A−B<θ, OTT$^f$min is changed to a smaller one of a value of RTTmin minus OTT$^b$min and a value of OTT$^f$min(t−N, t).

Scheme 2 is based on the following. Equation 9 shows a relationship of OTT$^f$min(t−N, t), which is a minimum value among OTT$^f$ values measured over a time interval from a time point t−N to a time point t, and a relationship of OTT$^b$min(t−N, t), which is a minimum value among OTT$^b$ values measured over the time interval.

$$\text{baseOTT}^f(t) \leq OTT^f\text{min}(t-N,t) + \eta$$

$$\text{baseOTT}^b(t) \leq OTT^b\text{min}(t-N,t) + \eta \qquad \text{[Equation 9]}$$

In Equation 9, $\eta = \alpha \times N$.

If N is sufficiently small in the above equation, η is significantly small as well.

Accordingly, assuming that η is negligible, Equation 10 below holds.

$$baseOTT^f(t) \leq OTT^f\min(t-N,t)$$

$$baseOTT^b(t) \leq OTT^b\min(t-N,t) \quad \text{[Equation 10]}$$

Accordingly, error enhancements may be further achieved by, if α>0, changing $OTT^f$min as shown in the twentieth line of the pseudo code of FIG. 6, instead of changing $OTT^f$min as shown in the sixteenth line of the pseudo code of FIG. 5, and, if α<0, changing $OTT^b$min as shown in the sixteenth line of the pseudo code of FIG. 6, instead of changing $OTT^b$min as shown in the fourteenth line of the pseudo code of FIG. 5. In view of the foregoing, it is understood that $OTT\min^f(t-N, t)$ and $OTT\min^b(t-N, t)$ serve as a forward OTT reference value for estimating a forward queuing delay and a backward OTT reference value for estimating a backward queuing delay, respectively.

In accordance with a certain exemplary embodiment of the present disclosure, the reference value collecting unit 210 of the queuing delay estimation apparatus 200 of FIG. 2 obtains RTTmin, $OTT^f$min and $OTT^b$min, the reference value updating unit 220 of the queuing delay estimation apparatus 200 selectively updates $OTT^f$min or $OTT^b$min, and then the queuing delay estimating unit 230 of the queuing delay estimation apparatus 200 estimates at least one of a forward queuing delay and a backward queuing delay, according to at least one of the techniques described earlier with reference to FIGS. 4 to 6. The estimated forward queuing delay $Qdelay^f(t)$ and backward queuing delay $Qdelay^b(t)$ are given as shown in Equation 11 below, in which $OTT^f\min(0, t)$ and $OTT^b\min(0, t)$ in Equation 2 are replaced with $OTT^f$min and $OTT^b$min, respectively.

$$Qdelay^f(t) = OTT^f(t) - OTT^f\min$$

$$Qdelay^b(t) = OTT^b(t) - OTT^b\min \quad \text{[Equation 11]}$$

The queuing delay estimation according to the techniques described above facilitates improved transmission control. For instance, when a network including a transmitter and a receiver has a backward queuing delay but does not suffer from a forward queuing delay, performing transmission control using a queuing delay which is estimated only based on an RTT measurement value may lower the utilization efficiency of the network.

Figure 7:
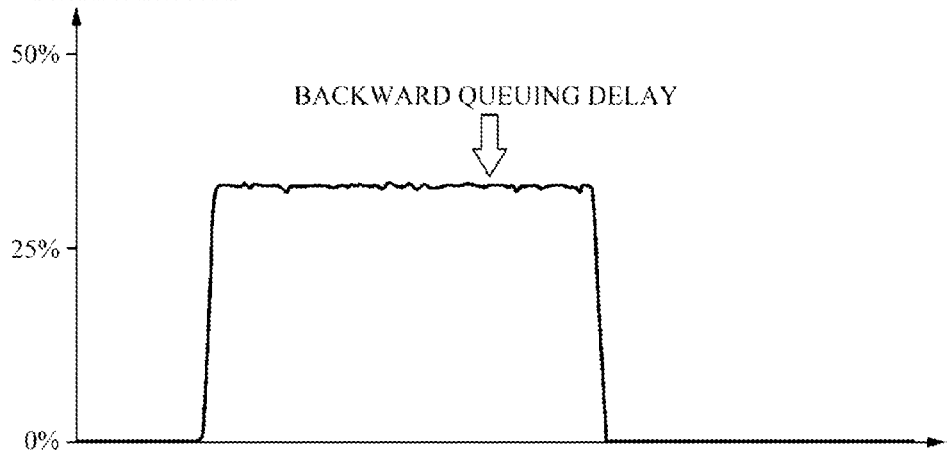
FIG. 7 shows a simulation result of transmission control based on a queuing delay estimation according to an exemplary embodiment of the present disclosure.
Figure 8:
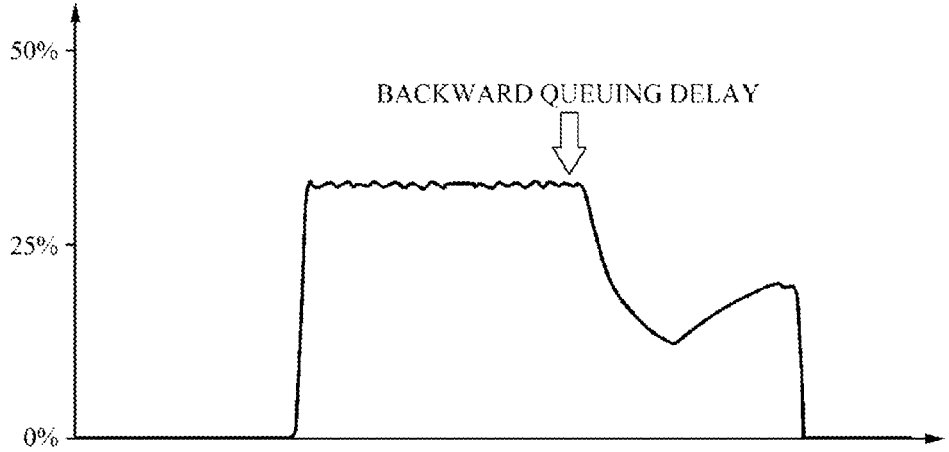
FIG. 8 shows a simulation result of transmission control based on a conventional queuing delay estimation.

FIG. 7 shows a simulation result of transmission control based on a queuing delay estimation according to an exemplary embodiment of the present disclosure, while FIG. 8 shows a simulation result of transmission control based on a conventional queuing delay estimation. For these simulations, a file transfer application was executed between two computers each of which has Microsoft Windows® 7 installed thereon as an operating system. The simulations were performed such that after initiation of a file transfer, a backward queuing delay occurred at an average rate of 20 ms over a certain time interval. Graph 710 of FIG. 7 and graph 720 of FIG. 8 represent results obtained from a task manager provided by Microsoft Windows® 7. Graph 710 shows a rate of utilization of a network interface of the computer that transfer a file when the queuing delay estimation technique in accordance with the process described in the pseudo code of FIG. 5 is applied for the file transfer. Graph 720 shows a rate of utilization of the network interface when a conventional technique for estimating a queuing delay using only an RTT measurement value is applied. As shown in graph 720, the conventional queuing delay estimation technique shows an abrupt drop in the utilization rate with the occurrence of a backward queuing delay. Meanwhile, with reference to graph 710, it can be appreciated that the queuing delay estimation technique of FIG. 5 allows the normal performance of transmission control even if a backward queuing delay occurs.

According to a certain exemplary embodiment, errors in estimation of a queuing delay (for example, a forward queuing delay) that is used to perform transmission control in a network including a transmitter and a receiver can be minimized.

A queuing delay estimated according to a certain exemplary embodiment may have a reduced error bound, as compared to a queuing delay estimated based on a measured RTT value according to the conventional TCP-Vegas technique.

According to a certain exemplary embodiment, a queuing delay (for example, a forward queuing delay) can be more precisely estimated with less complexity, as compared to an approach of obtaining an absolute value of a clock skew to eliminate errors due to the clock skew.

Meanwhile, exemplary embodiments of the present disclosure may include a computer-readable recording medium including a program for performing the methods described in the present specification. The computer-readable recording medium may include program instructions, local data files, and local data structures, alone or in combination. The medium may be specially designed and configured for the present disclosure, or well known and available to those skilled in the field of computer software. Examples of the computer-readable recording medium include magnetic media such as a hard disk, a floppy disk and a magnetic tape, optical recording media such as a CD-ROM and a DVD, a magneto-optical medium such as a floptical disk, and hardware devices, specially configured to store and execute program instructions, such as a ROM, a RAM, and a flash memory. Examples of the program instructions may include high-level language codes executable by a computer using an interpreter or the like, as well as machine language codes made by a compiler.

It will be apparent to those familiar with this field that various modifications can be made to the above-described exemplary embodiments of the present disclosure without departing from the spirit or scope of the disclosure.

Thus, it is intended that the present disclosure covers all such modifications provided they come within the scope of the appended claims and their equivalents.

What is claimed is:

1. A method of estimating a queuing delay, the method comprising:
    obtaining values in association with a data transmission between a transmitter and a receiver, during an interval from a first measurement time point to a second measurement time point, including:
        measuring round trip time (RTT) values to provide measured RTT values, and taking a minimum one of the measured RTT values as a RTT reference value,
        measuring forward one-way transmit time (OTT) values to provide measured forward OTT values, and taking a minimum one of the measured forward OTT values of the interval as a forward OTT reference value, and
        measuring backward OTT values to provide measured backward OTT values, and taking a minimum one of the measured backward OTT values of the interval as a backward OTT reference value, wherein the forward OTT reference value and the backward OTT reference value constitute two OTT reference values; and
    updating at least one of the two OTT reference values, including:

determining a rate of increment, in a local time of the transmitter, as a first increment rate;
determining a rate of increment, in a local time of the receiver, as a second increment rate, wherein the first increment rate and the second increment rate constitute increment rates;
making a determination as to which one of the increment rates is a largest increment rate;
in accordance with the largest increment rate, selecting for update one of the two OTT reference values;
updating the selected one of the two OTT reference values based on the RTT reference value; and
correcting a clock skew between the transmitter and the receiver based on the selected OTT reference values.

2. The method of claim 1, wherein the selected one of the two OTT reference values is updated based on also the unselected one the two OTT reference values.

3. The method of claim 1, wherein the measured forward OTT values and the measured backward OTT values are measured from the first measurement time point to the second measurement time point.

4. The method of claim 1, further comprising, after the updating of the at least one of the two OTT reference values, performing at least one of:
estimating a forward queuing delay, associated with the data transmission, based on:
the forward OTT reference value, and
the one of the measured forward OTT values measured at the second measurement time point; and
estimating a backward queuing delay, associated with the data transmission, based on
the backward OTT reference value, and
the one of the measured the backward OTT values measured at the second measurement time point.

5. The method of claim 1, further comprising:
when the first increment rate is the largest increment rate, setting the backward OTT reference value as the one of the two OTT reference values selected for update, and performing the updating based also on the forward OTT reference value; and
when the second increment rate is the largest increment rate, setting the forward OTT reference value as the one of the two OTT reference values selected for updating, and performing the updating based also on the backward OTT reference value.

6. The method of claim 1, wherein the determination comprises:
identifying, as a forward OTT reference time point, a point in time corresponding to the measuring of the minimum one of the measured forward OTT values;
identifying, as a backward OTT reference time point, a point in time corresponding to the measuring of the minimum one of the measured backward OTT values;
when the forward OTT reference time point is the second measurement time point:
determining a first time difference between the second measurement time point and the backward OTT reference time point, and
making a first determination as to whether the first time difference exceeds a threshold; and
when the backward OTT reference time point is the second measurement time point:
determining a second time difference between the second measurement time point and the forward OTT reference time point, and
making a second determination as to whether the second time difference exceeds the threshold.

7. The method of claim 6, further comprising:
when the first determination is affirmative, updating the backward OTT reference value based on the RTT reference value and the forward OTT reference value; and
when the second determination is affirmative, updating the forward OTT reference value based on the RTT reference value and the backward OTT reference value.

8. The method of claim 1, wherein the RTT reference value is set to the one of the measured RTT values corresponding to the first measurement time point.

9. The method of claim 8, further comprising:
measuring, at a measurement time point later in time than the second measurement time point, an additional measured forward OTT value, an additional measured backward OTT value and an additional measured RTT value associated with the data transmission; and
when the additional measured RTT value is larger than the RTT reference value, repeating the obtaining and the updating.

10. The method of claim 8, further comprising:
setting an additional forward OTT reference value as the one of the measured forward OTT values corresponding to the first measurement time point;
setting an additional backward OTT reference value as the one of the measured backward OTT values corresponding to the first measurement time point;
determining a forward OTT reference difference value by calculating a difference between the additional forward OTT reference value and the forward OTT reference value; and
determining a backward OTT reference difference value by calculating a difference between the additional backward OTT reference value and the forward OTT reference value;
wherein the determination of the largest increment rate includes comparing the forward OTT reference difference value with a sum of the backward OTT reference difference value and a predetermined threshold value.

11. The method of claim 10, further comprising:
when the forward OTT reference difference value is larger than the sum, updating the RTT reference value based on the backward OTT reference difference value, and then updating the additional backward OTT reference value to the backward OTT reference value; and
when the forward OTT reference difference value is smaller than the sum, updating the RTT reference value based on the forward OTT reference difference value, and then updating the additional forward OTT reference value to the forward OTT reference value.

12. The method of claim 10, wherein the updating comprises:
identifying a predetermined measurement time point in the interval between the first measurement time point and the second measurement time point, wherein an interval between the predetermined measurement time point and the second measurement time point constitutes a second interval;
taking a minimum one of the measured forward OTT values of the second interval as yet another forward OTT reference value;
taking a minimum one of the measured backward OTT values of the second interval as yet another backward OTT reference value;
when the forward OTT reference difference value is larger than the sum, updating the yet another backward OTT reference value, and then updating the backward OTT reference value based on the RTT reference value, the forward OTT reference value, and the yet another backward OTT reference value; and when the forward OTT reference difference value is smaller than the sum, updating the yet another forward OTT reference value, and then updating the forward OTT reference value based on the RTT reference value, the backward OTT reference value, and the yet another forward OTT reference value.

13. A non-transitory computer readable recording medium having computer executable instructions stored thereon which, when executed by a hardware processor, enables the hardware processor to implement operations, comprising:

obtaining values in association with a data transmission between a transmitter and a receiver, during an interval from a first measurement time point to a second measurement time point, including:

measuring round trip time (RTT) values to provide measured RTT values, and taking a minimum one of the measured RTT values as a RTT reference value, measuring forward one-way transmit time (OTT) values to provide measured forward OTT values, and taking a minimum one of the measured forward OTT values of the interval as a forward OTT reference value, and measuring backward OTT values to provide measured backward OTT values, and taking a minimum one of the measured backward OTT values of the interval as a backward OTT reference value, wherein the forward OTT reference value and the backward OTT reference value constitute two OTT reference values;

updating at least one of the two OTT reference values, including:

determining a rate of increment, in a local time of the transmitter, as a first increment rate;

determining a rate of increment, in a local time of the receiver, as a second increment rate, wherein the first increment rate and the second increment rate constitute increment rates;

making a determination as to which one of the increment rates is a largest increment rate;

in accordance with the largest increment rate, selecting for update one of the two OTT reference values;

updating the selected one of the two OTT reference values based on the RTT reference value; and correcting a clock skew between the transmitter and the receiver based on the selected OTT reference values.

14. An apparatus for estimating a queuing delay, the apparatus comprising:

a reference value collecting unit configured to perform an operation of obtaining values in association with a data transmission between a transmitter and a receiver, during an interval from a first measurement time point to a second measurement time point, including:

measuring round trip time (RTT) values to provide measured RTT values, and taking a minimum one of the measured RTT values as a RTT reference value, measuring forward one-way transmit time (OTT) values to provide measured forward OTT values, and taking a minimum one of the measured forward OTT values of the interval as a forward OTT reference value, and measuring backward OTT values to provide measured backward OTT values, and taking a minimum one of the measured backward OTT values of the interval as a backward OTT reference value, wherein the forward OTT reference value and the backward OTT reference value constitute two OTT reference values; and an updating unit configured to perform an operation of updating at least one of the two OTT reference values, including:

determining a rate of increment, in a local time of the transmitter, as a first increment rate;

determining a rate of increment, in a local time of the receiver, as a second increment rate, wherein the first increment rate and the second increment rate constitute increment rates;

making a determination as to which one of the increment rates is a largest increment rate;

in accordance with the largest increment rate, selecting for update one of the two OTT reference values;

updating the selected one of the two OTT reference values based on the RTT reference value; and correcting a clock skew between the transmitter and the receiver based on the selected OTT reference values;

wherein at least one of the reference value collecting unit and the updating unit is implemented using a hardware processor.

15. The apparatus of claim 14, wherein the selected one of the two OTT reference values is updated based on also the unselected one the two OTT reference values.

16. The apparatus of claim 14, wherein the measured forward OTT values and the measured backward OTT values are measured from the first measurement time point to the second measurement time point.

17. The apparatus of claim 14, further comprising: a queuing delay estimating unit configured to perform, after the updating of the at least one of the two OTT reference values, performing at least one of:

estimating a forward queuing delay, associated with the data transmission, based on the forward OTT reference value, and the one of the measured forward OTT values measured at the second measurement time point; and estimating a backward queuing delay, associated with the data transmission, based on the backward OTT reference value, and the one of the measured the backward OTT values measured at the second measurement time point.

18. The apparatus of claim 14, further comprising:

when the first increment rate is the largest increment rate, setting the backward OTT reference value as the one of the two OTT reference values selected for update, and performing the updating based also on the forward OTT reference value; and when the second increment rate is the largest increment rate, setting the forward OTT reference value as the one of the two OTT reference values selected for updating, and performing the updating based also on the backward OTT reference value.

19. The apparatus of claim 14, wherein the determination comprises:

identifying, as a forward OTT reference time point, a point in time corresponding to the measuring of the minimum one of the measured forward OTT values;

identifying, as a backward OTT reference time point, a point in time corresponding to the measuring of the minimum one of the measured backward OTT values;

when the forward OTT reference time point is the second measurement time point:

determining a first time difference between the second measurement time point and the backward OTT reference time point, and making a first determination as to whether the first time difference exceeds a threshold; and when the backward OTT reference time point is the second measurement time point:
  determining a second time difference between the second measurement time point and the forward OTT reference time point, and
  making a second determination as to whether the second time difference exceeds the threshold.

20. The apparatus of claim 19, further comprising:
when the first determination is affirmative, updating the backward OTT reference value based on the RTT reference value and the forward OTT reference value; and
when the second determination is affirmative, updating the forward OTT reference value based on the RTT reference value and the backward OTT reference value.

21. The apparatus of claim 14, wherein the RTT reference value is set to the one of the measured RTT values corresponding to the first measurement time point.

22. The apparatus of claim 21, wherein:
the reference value collecting unit is further configured to measure, at a measurement time point later in time than the second measurement time point, an additional measured forward OTT value, an additional measured backward OTT value and an additional measured RTT value associated with the data transmission, and
when the additional measured RTT value is larger than the RTT reference value, the reference value collecting unit repeats the obtaining operation and the reference value updating unit repeats the updating operation.

23. The apparatus of claim 21, wherein:
the reference value collecting unit is further configured to set an additional forward OTT reference value as the one of the measured forward OTT reference values corresponding to the first measurement time point, set an additional backward OTT reference value as the one of the measured backward OTT values corresponding to the first measurement time point, determine a forward OTT reference difference value by calculating a difference between the additional forward OTT reference value and the forward OTT reference value, and determine a backward OTT reference difference value by calculating a difference between the additional backward OTT reference value and the forward OTT reference value; and
wherein the determination of the largest increment rate comprises includes comparing the forward OTT reference difference value with a sum of the backward OTT reference difference value and a predetermined threshold value.

24. The apparatus of claim 23, wherein the reference value updating unit is further configured to, when the forward OTT reference difference value is larger than the sum, update the RTT reference value based on the backward OTT reference difference value, and then update the additional backward OTT reference value to the backward OTT reference value, and to, when the forward OTT reference difference value is smaller than the sum, update the RTT reference value based on the forward OTT reference difference value, and then update the additional forward OTT reference value to the forward OTT reference value.

25. The apparatus of claim 23, wherein the updating operation comprises:
identifying a predetermined measurement time point in the interval between the first measurement time point and the second measurement time point, wherein an interval between the predetermined measurement time point and the second measurement time point constitutes a second interval;
taking a minimum one of the measured forward OTT values of the second interval as yet another forward OTT reference value;
taking a minimum one of the measured backward OTT values of the second interval as yet another backward OTT reference value;
when the forward OTT reference difference value is larger than the sum, updating the yet another backward OTT reference value, and then updating the backward OTT reference value based on the RTT reference value, the forward OTT reference value, and the yet another backward OTT reference value; and
when the forward OTT reference difference value is smaller than the sum, updating the yet another forward OTT reference value, and then updating the forward OTT reference value based on the RTT reference value, the backward OTT reference value, and the yet another forward OTT reference value.

* * * * *